United States Patent [19]

Iovine et al.

[11] Patent Number: 5,346,974
[45] Date of Patent: Sep. 13, 1994

[54] POLYETHER POLYCARBOXYLATE COMPOSITIONS USEFUL AS DETERGENT BUILDERS

[75] Inventors: Carmine P. Iovine, Bridgewater; Rama S. Chandran, So. Bound Brook; John C. Leighton, Flanders, all of N.J.

[73] Assignee: National Starch and Chemical Investment Holding Corporation, Wilmington, Del.

[21] Appl. No.: 946,714

[22] Filed: Sep. 17, 1992

Related U.S. Application Data

[62] Division of Ser. No. 690,741, Apr. 24, 1991, Pat. No. 5,187,238, which is a division of Ser. No. 422,355, Oct. 16, 1989, Pat. No. 5,087,682.

[51] Int. Cl.$^5$ .................. C08F 222/02; C08F 220/04; C08F 224/00; C08F 222/06; C08F 222/10; C08F 216/12; C08F 218/04
[52] U.S. Cl. .................................. 526/240; 526/270; 526/271; 526/317.1; 526/318.2; 526/328.5; 526/330; 526/332; 525/327.8
[58] Field of Search ............ 526/271, 240, 270, 317.1, 526/318.2, 328.5, 330, 332

[56] References Cited

U.S. PATENT DOCUMENTS

| | | | |
|---|---|---|---|
| 2,911,391 | 11/1959 | Vandenberg | 525/327.4 |
| 3,534,067 | 10/1970 | Rempfer et al. | 260/347.3 |
| 3,962,195 | 6/1976 | Moczygemba et al. | 526/11.1 |
| 3,985,670 | 10/1976 | Berg et al. | 252/117 |
| 4,011,282 | 3/1977 | Bacskai | 260/836 |
| 4,072,622 | 2/1978 | Kuhling et al. | 252/179 |
| 4,647,396 | 3/1987 | Denzinger et al. | 252/174.24 |
| 4,663,071 | 5/1987 | Bush et al. | 252/174.19 |
| 4,755,319 | 7/1988 | Smolka et al. | 252/174.25 |

OTHER PUBLICATIONS

N. I. Sax and R, J. Lewis, Sr., Hawley's Condensed Chemical Dictionary, 11th ed., 1987, p. 938.
Morton, A. A., "The Chemistry of Heterocyclic Compounds", McGraw–Hill Book Company, Inc. (1946) pp. 7–13.
Gaylord, N. G., et al., *J. Macromol. Sci.-Chem.*, A6(8) 1459–1480 (1972).
Gaylord, N. G., et al., *J. Poly. Sci.:Poly. Chem. Ed.*, 16: 1527–37 (1978).
Butler, G., *J. Macromol. Sci.-Chem.*, A4(1) 51–63 (1970).

*Primary Examiner*—Joseph L. Schofer
*Assistant Examiner*—Wu C. Cheng
*Attorney, Agent, or Firm*—Ellen T. Dec

[57] ABSTRACT

This invention provides polyether polycarboxylate compositions selected from the group consisting of polyether polycarboxylates which may be prepared by oxidizing copolymers of furan and maleic anhydride, and other polyether polycarboxylate compositions prepared by oxidizing novel, intermediate polymers of furan, maleic anhydride, and at least one copolymerizable comonomer, selected from the group consisting of furan, alkenyl alkyl ethers, alkyl acrylates, alkenyl carboxyalkyl ethers, vinyl esters of carboxylic acids, unsaturated carboxylic acids, unsaturated dicarboxylic acids and their anhydrides and esters, and olefins. This invention also provides novel, unoxidized terpolymer intermediates comprising furan, maleic anhydride, and at least one copolymerizable comonomer, other than furan and maleic anhydride, selected from the above group, as well as a process for oxidizing these polymers and the furan and maleic anhydride copolymers. These compositions are useful as builders and as anti-redeposition agents in detergents.

8 Claims, 3 Drawing Sheets

POLYETHER POLYCARBOXYLATE COMPOSITIONS USEFUL AS DETERGENT BUILDERS

This application is a division of application Ser. No. 07/690,741, filed Apr. 24, 1991, now U.S. Pat No. 5,187,238, which is a division of application Ser. No. 07/422,355, filed Oct. 16, 1989, and issued as U.S. Pat. No. 5,087,682 on Feb. 11, 1992.

BACKGROUND OF THE INVENTION

This invention relates to polyether polycarboxylate compositions and a method for their preparation. These compositions are selected from the group consisting of polyether polycarboxylate compositions which may be prepared by oxidizing copolymers of furan and maleic anhydride, and other polyether polycarboxylate compositions prepared by oxidizing novel, intermediate polymers of furan, maleic anhydride, and at least one copolymerizable comonomer, selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids and their anhydrides and esters, olefins, and furan. This invention also relates to unoxidized terpolymer intermediates comprising furan, maleic anhydride, and at least one copolymerizable comonomer, other than furan and maleic anhydride, selected from the above group. These compositions are useful as builders and as anti-redeposition agents in detergents. These compositions may also be used as chelating agents, dispersants, scale inhibitors and, in a variety of other applications which require hardness sequestration or crystal modification (e.g., dentrifices).

Furan/maleic anhydride ("F/MA") copolymers are known. The utility of 1:1 copolymers of maleic anhydride and ethylene or propylene or furan as builders, co-builders and anti-redeposition agents in various detergent compositions is disclosed in U.S. Pat. No. 4,647,396, issued Mar. 3, 1987 to Denzinger, et al.

The unoxidized F/MA terpolymer intermediates and polyether polycarboxylate compositions prepared by oxidation of F/MA copolymers and terpolymer intermediates are novel compositions of matter.

As used herein, "furan" refers to 2,5-dihydrofuran, 2-methylfuran, 2,5-dimethylfuran, 2-ethylfuran, 2,5-diethylfuran, 2-ethyl-5-methytfuran, or a combination thereof.

SUMMARY OF THE INVENTION

This invention provides polyether polycarboxylate compositions selected from the group consisting of oxidized copolymers derived from copolymers of furan and maleic anhydride, and oxidized polymers derived from polymers of furan, maleic anhydride and at least one copolymerizable comonomer, which comonomer is selected from the group consisting of alkenyl alkyl ethers, alkylacrylates, alkenyl carboxyalkyl ethers, vinyl esters of carboxylic acids, unsaturated carboxylic acids, unsaturated dicarboxylic acids and their anhydrides and esters, olefins and furan. This invention also provides unoxidized terpolymer intermediates, comprising polymers of furan, maleic anhydride and at least one copolymerizable comonomer, other than furan and maleic anhydride, selected from the above group, and a process for oxidizing these polymers and the furan and maleic anhydride copolymers. These oxidized and unoxidized polymers may be used as detergent builders and anti-redeposition agents.

The polymer prepared by oxidizing copolymers comprises repeating units of structure I:

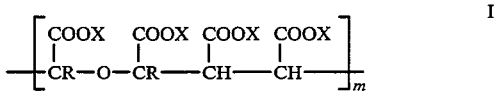

R is H, —CH$_3$, —CH$_2$CH$_3$, or a combination thereof; X is H, or a salt forming cation, or a C$_1$–C$_{12}$ alkyl substituent, or a C$_5$–C$_{12}$ cycloalkyl substituent having at least one five- or six-membered ring, or a combination thereof; and m is at least 1 and typically ranges from about 1 to 300.

A process for oxidizing polymers to yield polymers with one or more repeating units of structure I is provided herein. This process comprises a) polymerizing the monomers to form a polymer which contains a 2,5-dihydrofuran residue; and b) oxidizing the 2,5-dihydrofuran residue by reacting the polymer with an oxidizing reagent selected from the group consisting essentially of a mixture of ozone and hydrogen peroxide; a mixture of sodium tungstate and hydrogen peroxide; potassium permanganate; and nitric acid.

The unoxidized F/MA terpolymer intermediates comprise polymers of maleic anhydride, furan and at least one copolymerizable comonomer selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids other than maleic acid and their anhydrides and esters, and olefins. The optional comonomer(s) may be present in any proportion provided that, following oxidation, the oxidized F/MA terpolymer contains at least one unit of structure I. The unoxidized polymers are novel intermediates in the preparation of the oxidized polymers. The unoxidized polymers are exemplified by compositions wherein the comonomer is isobutyl vinyl ether, methyl acrylate, methyl vinyloxyacetate, acrylic acid, itaconic acid, or styrene.

This invention also provides polymers prepared by oxidizing polymers of furan and maleic anhydride and at least one copolymerizable comonomer, selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids and their anhydrides and esters, olefins, and furan.

These oxidized and unoxidized polymers are useful as detergent builders and may be utilized in the salt (e.g., sodium, potassium, ammonium, monoethanolamine or triethanolamine) form, or in the acid, alkyl or cycloalkyl ester, or anhydride form. The number average molecular weight of these polymers in the anhydride form is between 500 and 1,000,000.

DESCRIPTION OF THE DRAWINGS

FIG. 2 is 0.4 g/l). In these figures, the free calcium ion concentration remaining after treatment is plotted against the initial calcium ion load (60, 120, 180 or 240 ppm) added to solutions of the builders. Test methods and data used to generate These drawings are set forth in Example 4 and Table III, below.

DESCRIPTION OF THE PREFERRED EMBODIMENTS FURAN/MALEIC ANHYDRIDE POLYMERS

Figure 1:
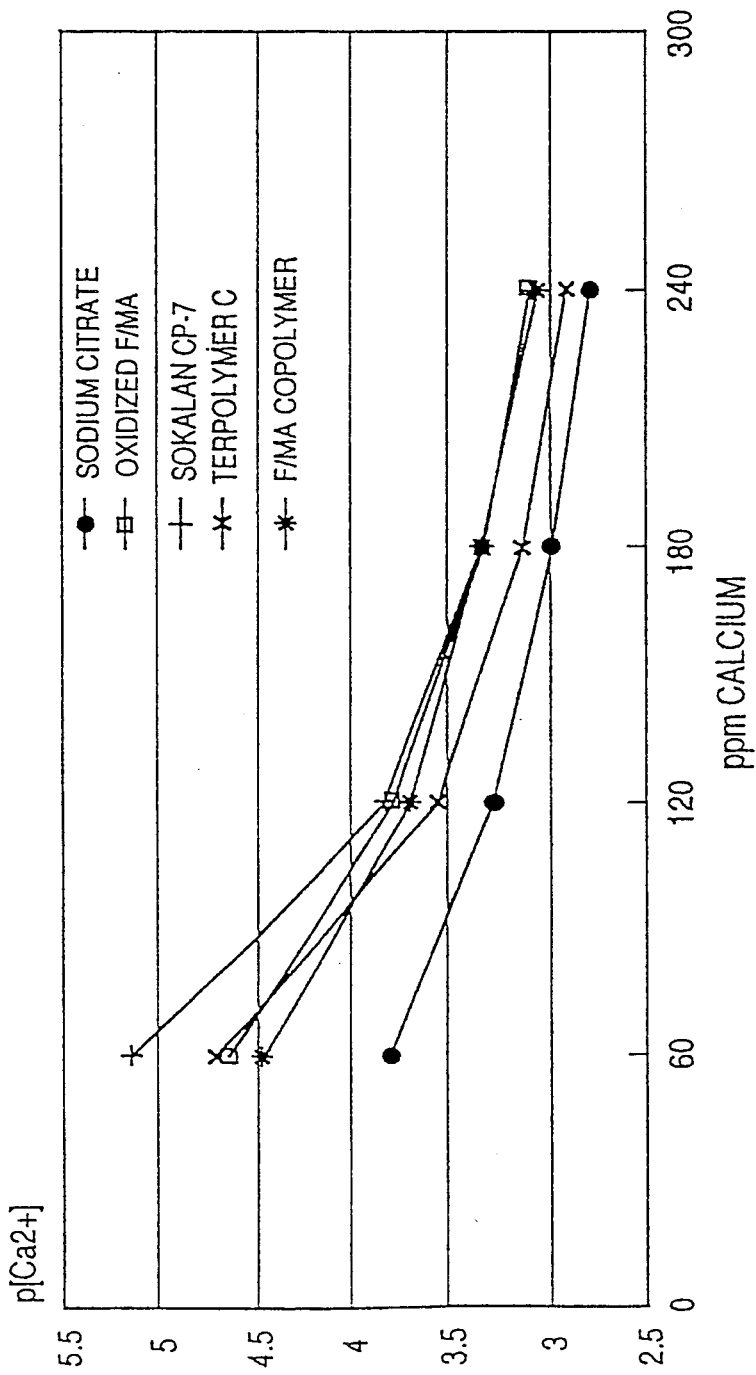
FIGS. 1 and 2 are two graphs illustrating calcium sequestration by detergent builders at two builder concentration levels (FIG. 1 is 0.2 g/l.

The F/MA copolymer is a substantially linear polymer, prepared by the method described in Gaylord, N. G., et al., *J. Macromol. Sci.-Chem.*, A6(1), 1459–1480 (1972). Alternatively, the F/MA copolymer may be prepared by any method known in the art for copolymerization of furan and at least one comonomer to yield a substantially linear copolymer. In preparing the copolymer, the furan and maleic anhydride monomers are converted to the 1:1 F/MA copolymer in high yield. The F/MA copolymer comprises repeating units of structure II when employed in the anhydride form:

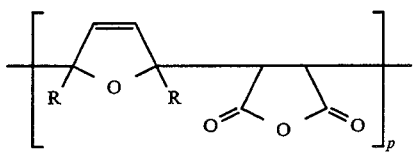

II

R is H, —CH$_3$, —CH$_2$CH$_3$, or a combination thereof; and p is an integer from about 5 to 6,000.

In the hydrolyzed (salt, acid or ester) form, the F/MA copolymer comprises a repeating unit of structure III:

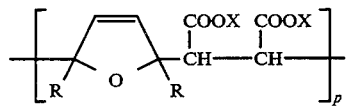

III

R is H, —CH$_3$, —CH$_2$CH$_3$, or a combination thereof; X is H, or a salt forming cation, or a C$_1$–C$_{12}$ alkyl substituent (ester), or a C$_5$–C$_{12}$ cycloalkyl substituent (ester) having at least one five- or six-membered ring, or a combination thereof; and p is an integer from about 5 to 6,000. For the purposes of this invention, the salt, acid, ester or anhydride form, or combinations thereof, and stereoisomers of structures depicted herein, may be employed.

The molecular weight corresponding to 5 to 6,000 repeating units of III ranges from about 800 to 1,000,000. The ranges of the molecular weight of the copolymer are limited only by the method of preparation, and effectiveness of the polymer in its intended application. The corresponding number average molecular weight of the fully neutralized sodium salt of the copolymer ranges from about 1,100 to 1,500,000. In a preferred embodiment the sodium carboxylate salt of the polymer is prepared by dissolving the anhydride in water and neutralizing it with sodium hydroxide. The practitioner will recognize that if the anhydride form of the polymer is subjected to mildly alkaline aqueous conditions, hydrolysis to the carboxylic acid form will occur. The sodium, potassium, ammonium, monoethanolamine or triethanolamine carboxylate salt of the polymer are preferred in detergent applications. Although the polyvalent cations responsible for water hardness are generally not employed, any organic or inorganic base or salt forming cation may be utilized in preparing the salt of the polymer for detergent applications.

In a second preferred embodiment, a C$_1$–C$_{12}$ alkyl, or C$_5$–C$_{12}$ cycloalkyl (having at least one five- or six-membered ring) ester derivative of the moiety derived from the maleic anhydride (or acid) comonomer is formed by reacting the polymer with an excess of C$_1$–C$_{12}$ alcohol. This reaction may be conducted in an aprotic solvent (e.g., toluene). Suitable alkyl esters may be prepared with any alkyl alcohol (e.g., lauryl alcohol); and suitable cycloalkyl esters may be prepared with any cycloalkyl alcohol (e.g., cyclohexanol).

The F/MA polymers containing other comonomers are prepared in the same manner as the F/MA copolymer, except that at least one copolymerizable comonomer, selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids other than maleic acid and their anhydrides and esters, and olefins, is added to the reaction medium. Like the F/MA copolymer, the remaining furan/maleic anhydride/comonomer polymers are substantially linear polymers whose sodium salts have number average molecular weights in the range between 1,100 and 1,500,000.

The acid, salt, or ester form of the furan/maleic anhydride/comonomer polymer comprises repeat units of structure IV:

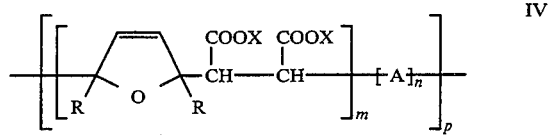

IV

R is H, —CH$_3$, —CH$_2$CH$_3$, or a combination thereof; X is H, or a salt forming cation, or a C$_1$–C$_{12}$ alkyl substituent (ester), or a C$_5$–C$_{12}$ cycloalkyl substituent (ester) having at least one five- or six-membered ring, or a combination thereof; m is at least one; n is greater than zero; and p is an integer from about 5 to 6,000. Structure A represents a repeating unit derived from at least one copolymerizable comonomer, selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids other than maleic acid and their anhydrides and esters, and olefins. Structure A may consist of one or more of the selected comonomer(s). Certain of these comonomers (e.g., acrylic acid and maleic acid) are known to form homopolymers and copolymers which have commercial utility as detergent builders (e.g., acrylic acid/maleic acid copolymer and polyacrylic acid).

Structure A is an optional component of the oxidized polymer, but an essential precursor in the various novel unoxidized polymer intermediates of this invention. Thus, in these novel unoxidized polymer intermediates, m is at least one, n must be greater than zero and p may range from about 5 to 5,000.

The practitioner will recognize that as the ratio of n to m increases, the preferred selection of comonomer(s) will shift toward those comonomers best suited to the polymer's intended use. Thus, for detergent use, comonomers with known effectiveness as calcium or magnesium sequestrants or as detergent builders are selected.

Likewise, as the ratio of m to n increases, the builder effectiveness of the comonomer(s) becomes less critical and other factors, such as cost and detergent formulation compatibility will guide comonomer(s) selection.

OXIDATION OF FURAN/MALEIC ANHYDRIDE POLYMERS

The polyether polycarboxylate compositions herein are prepared by the oxidation of the above-described F/MA copolymers and furan/maleic anhydride/comonomer polymers, as depicted schematically below:

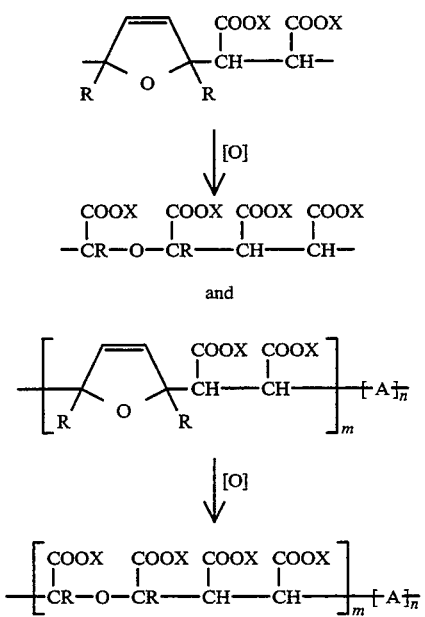

R, X, m, n and A are as previously defined. The oxidized polymer must contain at least one unit of the oxidized structures which are depicted above. The polymers may be fully or partially oxidized, and the oxidation product typically contains a mixture of partially oxidized polymers of various molecular weights. The molecular weight distribution will depend upon the method of oxidation and the amount of polymer degradation occurring during oxidation. Any method of oxidation may be employed, provided that degradation of the polymer is controlled such that the oxidized polymer has a molecular weight within a range suitable for the oxidized polymer's intended use(s).

Reagents useful in the oxidation process include ozone/hydrogen peroxide mixtures, potassium permanganate, sodium tungstate/hydrogen peroxide mixtures, and nitric acid (e.g., 44%). Any other reagent which will oxidatively cleave the carbon-carbon double bond contained in the 2,5-dihydrofuran residue of the polymers to yield carboxylic acid groups also may be employed herein. In a preferred embodiment nitric acid is employed as the oxidant. About 3.0 to 6.0 moles of nitric acid are provided for each mole of 2,5-dihydrofuran residue in the reaction medium at 60° to 90° C. In another preferred embodiment, ozone/hydrogen peroxide is employed as the oxidant. Both of these reagents produce a high degree of oxidation with moderate levels of polymer degradation.

Oxidation employing ozone/hydrogen peroxide may be carried out at a pH from 7 to 12; preferably 8.0 to 10.0, with polymer in a solvent such as water, acetone, or methanol at a temperature from 0° to 85° C., preferably 0° to 15° C. In a preferred embodiment, from about 1.5 to 4.0 moles of $O_3$ are provided for each mole of 2,5-dihydrofuran residue in the reaction medium. Oxidation is continued until the desired carboxylic acid number is achieved. Similar conditions for each type of oxidizing reagent are disclosed herein and other suitable conditions will be readily apparent to the practitioner.

The amount of polymer oxidation may be calculated from the carboxylic acid numbers (determined by titration with NaOH) of the oxidized and unoxidized polymers. The amount of oxidant is expressed herein as $O_3$/double bond equivalent ($O_3$/DBE) which represents the moles of $O_3$ per mole of 2,5-dihydrofuran residue in the polymer. The amount of oxidation may also be measured by C-13 NMR analysis or by any method known in the art.

In a preferred embodiment, a novel polymer is prepared by oxidation of a terpolymer containing a molar ratio of 2:1:1 of maleic anhydride, furan and isobutyl vinyl ether, exemplifying the class of alkenyl alkyl ether monomers. In a second preferred embodiment, a novel polymer is prepared by oxidation of a terpolymer containing a molar ratio of 2:1:1 of maleic anhydride, furan and methyl acrylate, exemplifying the class of alkyl acrylate monomers. In a third preferred embodiment, a novel polymer is prepared by oxidation of a terpolymer containing a molar ratio of 2:1:1 of maleic anhydride, furan and acrylic acid, exemplifying the class of unsaturated carboxylic acids. In a fourth preferred embodiment, a novel polymer is prepared by oxidation of a terpolymer containing a molar ratio of 2:1:1 of maleic anhydride, furan and methyl vinyloxyacetate, exemplifying the class of alkenyl carboxyalkyl ethers. (The methyl vinyloxyacetate may be hydrolyzed after polymerization to yield pendant carboxylic acid groups.) In a fifth preferred embodiment, a novel polymer is prepared by oxidation of a terpolymer containing a molar ratio of 2:1:1 of maleic anhydride, furan and itaconic acid, exemplifying the class of unsaturated dicarboxylic acids other than maleic acid and their anhydrides and esters. In a sixth preferred embodiment, a novel polymer is prepared by oxidation of a terpolymer containing a molar ratio of 2:1:1 of maleic anhydride, furan and styrene, exemplifying the class of olefins. In a seventh preferred embodiment, a novel polymer is prepared by oxidation of a terpolymer containing a molar ratio of 2:1:1 of maleic anhydride, furan and vinyl acetate, exemplifying the class of vinyl esters of carboxylic acids.

It will be recognized by the practitioner that although substantially linear copolymers of furan and maleic anhydride will not vary from the 1:1 molar ratio, the other polymers of this invention are not so limited. Thus, although both furan and maleic anhydride must be present along with at least one comonomer to form the other novel polymers, the molar ratio of furan, maleic anhydride and the comonomer(s) may vary.

Similarly, the practitioner will recognize that although certain comonomers are selected for the preferred embodiments disclosed herein, any monomers within the selected class may be utilized. Furthermore, small quantities of polyfunctional comonomers which are not within the selected classes may be utilized. Examples of such polyfunctional comonomers are acrylates and methacrylates of polyols, allyl and vinyl esters of polycarboxylic acids, divinyl benzene, and the like.

The alkenyl alkyl ether monomers useful herein include vinyl methyl ether, vinyl ethyl ether, vinyl n-propyl ether, vinyl i-propyl ether, vinyl n-butyl ether, vinyl sec-butyl ether, vinyl t-butyl ether, vinyl pentyl ether, higher vinyl alkyl ethers, and the like.

The alkyl acrylate monomers useful herein include methyl acrylate, ethyl acrylate, propyl acrylate, butyl acrylate, pentyl acrylate, and higher acrylates and corresponding 2-substituted acrylates where the 2-substitution is $C_1$–$C_6$ alkyl and cycloalkyl, and the like.

The alkenyl Carboxyalkyl ethers useful herein include methyl vinyloxyacetate, methyl vinyloxypropionate, methyl vinyloxybutanoate, methyl vinyloxypentanoate, vinyl 3,3-dicarboxymethylpropyl ether, vinyl 3,3,3-tricarboxymethylpropyl ether, and the like.

The polymerizable unsaturated carboxylic and dicarboxylic acid (and ester and anhydride) monomers useful herein include acrylic acid, methacrylic acid, maleic acid, itaconic acid, crotonic acid, and the like. The oxidized terpolymer may contain maleic acid (or anhydride or ester) as the third comonomer, but the novel, unoxidized terpolymers herein must contain a third comonomer in addition to maleic acid and furan.

The olefins useful herein include ethylene, propylene, 1-butene, 1-pentene, higher olefins, and substituted olefins such as styrene and the like.

The vinyl esters useful herein include vinyl formate, vinyl acetate, vinyl propionate, vinyl butanoate, vinyl pentanoate, vinyl neodecanoate, and the like.

Other substantially linear polymers, containing one, two or more comonomer(s) in addition to the furan and maleic anhydride comonomers, are intended to fall within the scope of this invention.

Additionally, although only one method of preparation of these polymers was employed in the preferred embodiments disclosed herein, it is intended that the polymers of this invention may be prepared by any method known in the art. The only limitations are that the polymer be prepared as a substantially linear copolymerized product containing the furan monomer, which upon hydrolysis of the anhydride rings of the polymer, forms dicarboxylic acid groups that are available for complexing metallic ions. Acceptable methods of preparation are known in the art and include Gaylord, N. G., et al., *J. Macromol Sci., Chem.*, A6(1), 1459–1480 (1972); Butler, G., et al., *J. Macromol., Sci., Chem.*, A4(1) 51–63 (1970); and Gaylord, N. G., et al., *J. Polymer Sci.: Polymer Chem. Ed.*, 16:1527–37 (1978).

This invention is illustrated by the following examples.

EXAMPLE 1

This example illustrates the preparation of the F/MA terpolymers and copolymer.

A. Preparation of F/MA terpolymer

A 500 ml, 4-necked flask was equipped with a mechanical stirrer, condenser, nitrogen inlet, addition funnel and thermometer. Maleic anhydride (14.4 g, 147 m mol) was dissolved in 55 ml of 50/50 (v/v) p-dioxane/methyl ethyl ketone and charged to the flask. Furan (5.0 g, 73.5 m mol), the third monomer (73.5 m mol, see Table 1), and t-amylperoxypivalate (0.48 g, 2.6 m mol) were dissolved in 45 ml of 50/50 (v/v) p-dioxane/methyl ethyl ketone and charged to the addition funnel. The flask was flushed with nitrogen, heated to 78° C. in a water bath and maintained under a nitrogen atmosphere while the furan/third monomer solution was slowly added with stirring over a period of 12 minutes. The reaction was permitted to continue for 2 hours at 80° C., and then the reaction mixture was cooled to room temperature. The reaction product was precipitated by adding the mixture to 500 ml of toluene with stirring. The product was washed twice with toluene (2×100 ml) and dried in a vacuum oven overnight at 50° C. Molecular weights were measured by gel permeation chromatography against dextran standards in dimethyl sulfoxide (DMSO).

The third monomers employed herein are listed in Table I. Characteristics of the terpolymers prepared from these monomers are also listed in Table I.

B. Preparation of F/MA copolymers

The copolymer was prepared by the same method as the terpolymer except that 7.2 g (73.5 m mol) of maleic anhydride and 5 g (73.5 m mol) of furan (1:1 molar ratio) were employed.

The yield was 83% (10 g) of dried powder and an additional 5% (0.6 g) of solid residue after removing the solvent from the filtrate, for a total yield of 88%. The molecular weight of the copolymer is listed in Table I.

TABLE I

F/MA Polymers

| Mole Ratio MA:F:M[a] | Optional Monomer | g of Optional Monomer | Molecular Weight Weight Average | Molecular Weight Number Average | Solubility in Water[b] |
|---|---|---|---|---|---|
| 1:1:0 | — | — | 7,050 | 2,570 | soluble |
| 2:1:1 | A. Acrylic acid | 18.0 | 9,900 | 2,200 | soluble |
| 2:1:1 | B. vinyl acetate | 21.5 | 11,700 | 3,670 | soluble |
| 2:1:1 | C. isobutyl vinyl ether | 25.0 | 7,100 | 2,670 | soluble |
| 2:1:1 | D. methyl acrylate | 21.5 | 12,170 | 3,875 | soluble |
| 2:1:1 | E. methyl vinyloxy acetate | 29.0 | 5,000 | 2,000 | soluble |

[a]M represents the optional monomer.
[b]At an alkaline pH (maintained with 0.1 N NaOH).

EXAMPLE 2

This example illustrates the preparation of high molecular weight F/MA copolymers.

Furan was copolymerized with maleic anhydride by the method disclosed in Butler, G. B., et al., *J. Macromol. Sci.-Chem.*, A4(1) 51–63 (1970), at page 52–53, except that the polymerization was carried out in toluene with 2 mole percent benzoyl peroxide as the initiator. The crude product contained 1.2% residual maleic anhydride.

A sodium carboxylate copolymer was obtained upon suspension of the anhydride copolymer in water, followed by neutralization with sodium hydroxide. After neutralization, the very high molecular weight copolymer which had been prepared with a benzoyl peroxide catalyst formed a light yellow gel.

The molecular weight of the copolymer could not be measured by gel permeation chromatography because it was insoluble. The insolubility of the copolymer, together with the ability of the copolymer to gel indicated that the copolymer was lightly crosslinked. The weight average molecular weight of the anhydride form of the F/MA copolymer was estimated to be in excess of 1,000,000.

EXAMPLE 3

This example illustrates the preparation of polyether polycarboxylates by the oxidation of a F/MA copolymer.

The F/MA copolymer was oxidized employing the reagents and conditions set forth in Table II, below.

TABLE II

Oxidation of F/MA Copolymers

| Oxidation Method[c] | Solvent | °C. Temp. | pH | $O_3$/DBE[a] | Mw[d] | Mn[e] | % Oxidation[b] |
|---|---|---|---|---|---|---|---|
| Control (F/MA copolymer) | — | — | — | — | 10,000 | 4,000 | 0 |
| Ozone/Hydrogen Peroxide | Water | 0–5 | 2 | 1.0 | 1,900 | 1,000 | 30 |
| Ozone/Hydrogen Peroxide | Water | 0–5 | 2 | 5.6 | 650 | 300 | 95 |
| Ozone/Hydrogen Peroxide | Water | 0–5 | 9 | 1.7 | 2,500 | 900 | 50 |
| Ozone/Hydrogen Peroxide | Water | 0–5 | 9 | 1.0 | 6,300 | 2,300 | 30 |
| Ozone/Hydrogen Peroxide | Methanol | 70 | — | 1.4 | 1,600 | 730 | 60 |
| Potassium Permanganate | Water | 0–10 | 9 | — | 1,300 | 740 | 45 |
| Potassium Permanganate | Acetone | 5 | — | — | 2,400 | 1,300 | 60 |
| Sodium Tungstate/ Hydrogen Peroxide | Water | 80 | 9 | — | 840 | 500 | 37 |
| 44% Nitric Acid | Water | 50 | — | — | 1,600 | 995 | 95 |

[a]$O_3$/DBE represents the moles of $O_3$ per mole of unsaturated furan residue.
[b]% Oxidation was determined by C-13 NMR.
[c]See Example 3, parts A–D.
[d]Weight average molecular weight (Mw) was determined by gel permeation chromatography.
[e]Number average molecular weight (Mn) was determined by gel permeation chromatography.

A. Oxidation by Ozone/Hydrogen Peroxide

1. Acidic Conditions

A 25 g sample of the copolymer in the anhydride form was dissolved in 200 ml of distilled water (pH 1.8 to 2.5) by heating the polymer suspension 15° to 50° C.

The solution was cooled to 5° C. and a mixture of $O_3$/$O_2$ was passed from an ozone generator. The extent of oxidation was controlled by controlling the amount of ozone which was allowed to contact the solution. Typically, an amount of $O_3$ sufficient to provide 2 mole equivalents of $O_3$ per mole of double bond was necessary to achieve high levels of oxidation.

After ozonolysis, 1.5 mole equivalent of $H_2O_2$ per mole of double bond was added and the solution heated to 60° C. for 3 hours. Sufficient NaOH was added to bring the pH to 7 to 8 and then the solution was concentrated to 40% solids. The solid polymer was isolated as a sodium salt by precipitation into methanol.

When the acid form of the oxidized polymer is desired, the carboxylate salt is converted to the acid by treating the polymer salt solution with a strong acid cation exchange resin.

2. Alkaline Conditions

Oxidation was carried out in the same manner as under acidic conditions except that the pH of the polymer solution was adjusted to 8.5 to 12.0 by the addition of sodium hydroxide.

B. Oxidation by Potassium Permanganate

A solution of the copolymer in water was prepared as described under Part "A. 1." above (ozone oxidation in acidic medium).

The solution was cooled to 5° C. and a solution of 8 g of $KMnO_4$ in 750 ml of water was slowly added, with stirring, while maintaining the reaction temperature at or below 5° C. After addition was complete, the reaction mixture was heated to 60° C. for 2 hrs. (a brown precipitate was formed). Sulfur dioxide gas was bubbled through the reaction mixture to reduce any unreacted manganate to $MnO_2$. The precipitated $MnO_2$ was filtered, and the clear light brown filtrate was treated with 500 ml of strong acid ion exchange resin to remove metal ions. The aqueous solution of the oxidized polymer was concentrated under vacuum to obtain 18 g of light brown powder.

C. Oxidation by Sodium Tungstate/Hydrogen Peroxide

This oxidation was carried out by the method described in EP 201,719A, except that sufficient 6M sulfuric acid was added to maintain a pH of 3 during the course of the reaction. After the reaction was complete, sufficent NaOH was added to obtain a pH of 8.0 and the oxidized polymer salt was isolated as a precipitate from methanol.

D. Oxidation by Nitric Acid

The oxidation using nitric acid was carried out by the method described in U.S. Pat. No. 3,534,067, except that after the oxidation the polymer solution was neutralized with sufficient NaOH to adjust the pH to 8.0 and the precipitated sodium nitrate was filtered off. The filtrate was concentrated to give a 40% solution of the polymer from which the solid polymer salt was precipitated into methanol.

As the results in Table II illustrate, the potassium permanganate and sodium tungstate oxidation methods created more polymer degradation and less polymer oxidation than the ozonolysis or nitric acid oxidation methods. Ozonolysis in alkaline medium minimized degradation but required greater than stoichiometric amounts of ozone to produce a high degree of oxidation.

EXAMPLE 4

This example illustrates the capacity of the F/MA polymers and their oxidized counterparts for calcium sequestration.

Aliquots of solutions containing 0.1, 0.2, 0.3 or 0.4 g/l of the experimental and control polymers were each treated with solutions of calcium chloride in water, containing, respectively, 60, 120, 180 and 240 ppm $Ca^{++}$ ion. A calcium ion selective electrode (Corning Radiometer F2110 Calcium Selective Electrode) was used to measure the free $Ca^{++}$ ion concentration of the treated solutions.

The polymers tested for calcium ion sequestration included the F/MA copolymer and terpolymers A-E of Example 1, sodium citrate (a builder commercially used in liquid detergents), and Sokalan ® CP-7 (a trademark registered to BASF Corporation and used in connection with a copolymer of acrylic acid and maleic acid, which is commercially used in powdered detergents).

Figure 2:
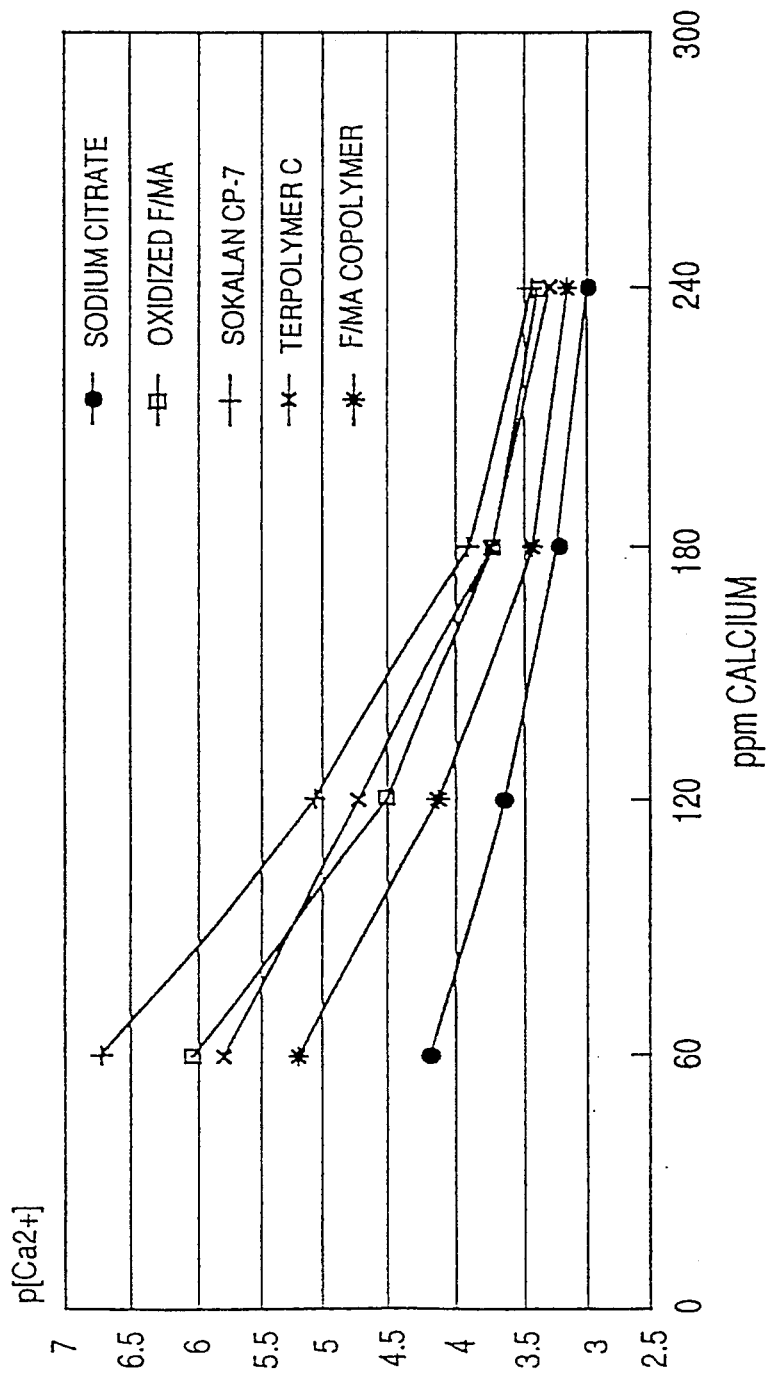

Results expressed as p ($Ca^{++}$) are set forth in Table III. Results are also illustrated in FIGS. 1 and 2. All treatments resulted in higher p ($Ca^{++}$) (indicating lower concentration of free $Ca^{++}$ ion remained in solution following treatment) as the treatment level was increased. Overall, the F/MA copolymer and terpolymers A-E sequestered calcium ions as effectively as the commercially used detergent builder. The Sokalan CP-7 builder was more effective at lower calcium ion concentrations and at the higher polymer concentrations which were tested. All experimental builders were more effective than sodium citrate under all test conditions. The oxidized and unoxidized F/MA copolymers were slightly more effective than the terpolymers.

TABLE III

Calcium Sequestration at 60 ppm, 120 ppm, 180 ppm and 240 ppm $Ca^{++}$

| Builder[b] | ppm $Ca^{++}$ | p($Ca^{++}$) Treatment Level (g/l) | | | |
|---|---|---|---|---|---|
| | | 0.1 | 0.2 | 0.3 | 0.4 |
| Sokalan ® CP-7 | 60 | 4.19 | 5.14 | 6.41 | 6.68 |
| | 120 | 3.46 | 3.82 | 4.52 | 5.04 |
| | 180 | 3.14 | 3.33 | 3.66 | 3.93 |
| | 240 | 2.93 | 3.08 | 3.26 | 3.40 |
| Sodium Citrate | 60 | 3.54 | 3.79 | 3.98 | 4.13 |
| | 120 | 3.10 | 3.28 | 3.45 | 3.61 |
| | 180 | 2.88 | 2.99 | 3.11 | 3.25 |
| | 240 | 2.72 | 2.80 | 2.90 | 3.00 |
| F/MA Copolymer | 60 | 4.02 | 4.49 | 4.88 | 5.17 |
| | 120 | 3.37 | 3.70 | 3.68 | 4.06 |
| | 180 | 3.03 | 3.32 | 3.25 | 3.45 |
| | 240 | 2.84 | 3.07 | 3.01 | 3.13 |
| Oxidized[a] F/MA Copolymer | 60 | 4.04 | 4.65 | 5.46 | 6.02 |
| | 120 | 3.46 | 3.70 | 4.05 | 4.48 |
| | 180 | 3.06 | 3.32 | 3.52 | 3.73 |
| | 240 | 2.97 | 3.10 | 3.22 | 3.35 |
| Terpolymer A (Acrylic Acid) | 60 | 3.81 | 4.58 | 5.25 | 5.92 |
| | 120 | 3.21 | 3.48 | 4.01 | 4.78 |
| | 180 | 2.96 | 3.11 | 3.34 | 3.84 |
| | 240 | 2.79 | 2.90 | 3.04 | 3.39 |
| Terpolymer B (Vinyl Acetate) | 60 | 3.62 | 4.07 | 4.62 | 4.99 |
| | 120 | 3.14 | 3.33 | 3.60 | 3.95 |
| | 180 | 2.90 | 3.01 | 3.17 | 3.36 |
| | 240 | 2.73 | 2.82 | 2.93 | 3.06 |
| Terpolymer C (Isobutyl vinyl ether) | 60 | 3.80 | 4.71 | 5.46 | 5.77 |
| | 120 | 3.21 | 3.55 | 4.10 | 4.66 |
| | 180 | 2.95 | 3.14 | 3.39 | 3.73 |
| | 240 | 2.78 | 2.91 | 3.06 | 3.25 |
| Terpolymer B (Methyl Acrylate) | 60 | 3.61 | 4.07 | 4.59 | 4.99 |
| | 120 | 3.14 | 3.34 | 3.57 | 3.88 |
| | 180 | 2.91 | 3.03 | 3.15 | 3.32 |
| | 240 | 2.75 | 2.84 | 2.91 | 3.02 |
| Terpolymer E (methyl | 60 | 3.78 | 4.62 | 5.23 | 5.66 |
| | 120 | 3.17 | 3.47 | 4.03 | 4.63 |

TABLE III-continued

Calcium Sequestration at 60 ppm, 120 ppm, 180 ppm and 240 ppm $Ca^{++}$

| Builder[b] | ppm $Ca^{++}$ | p($Ca^{++}$) Treatment Level (g/l) | | | |
|---|---|---|---|---|---|
| | | 0.1 | 0.2 | 0.3 | 0.4 |
| vinyl oxy-acetate)[c] | 180 | 2.91 | 3.05 | 3.31 | 3.74 |
| | 240 | 2.73 | 2.82 | 2.97 | 2.99 |

[a]Oxidation was carried out using ozone/hydrogen peroxide at a pH of 9.0.
[b]Terpolymers were in sodium salt form.
[c]Methyl ester of the vinyl oxyacetate was hydrolyzed during preparation of the sodium salt.

Figure 3:
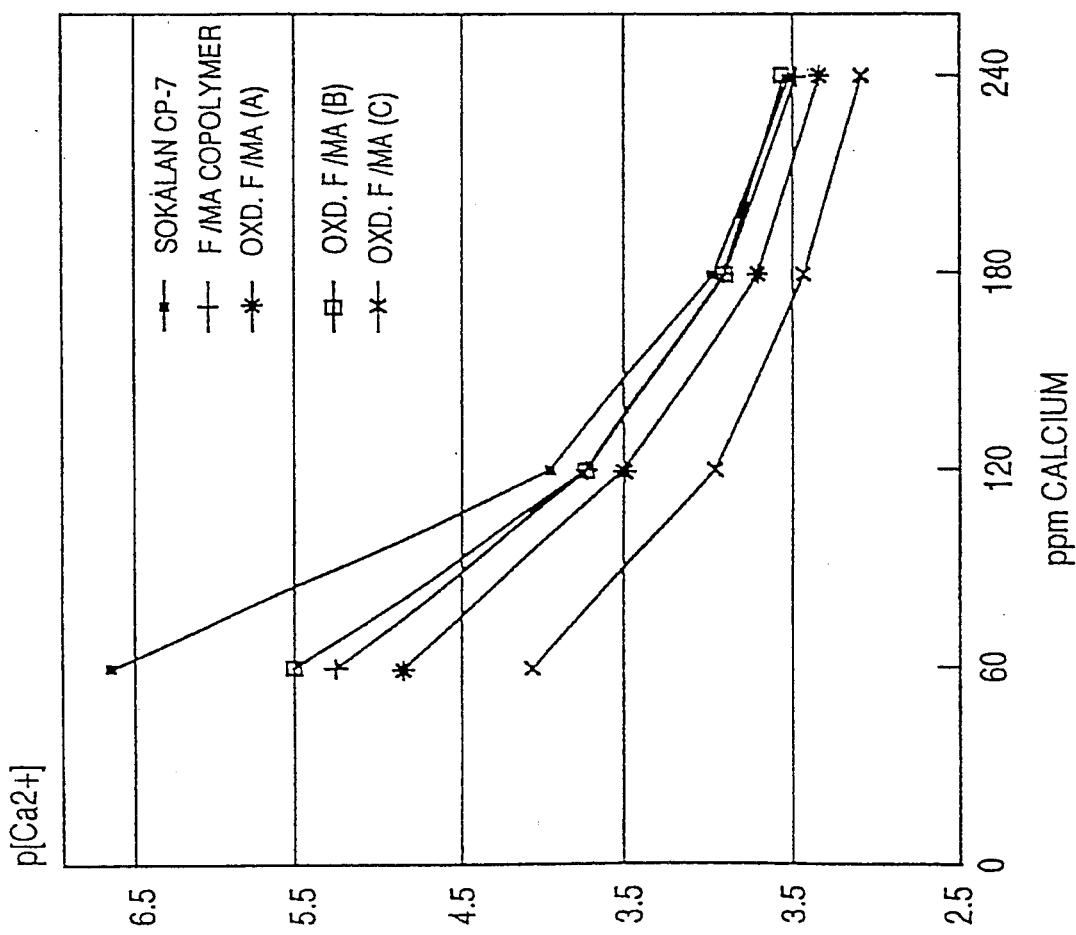
FIG. 3 is a graph illustrating calcium sequestration by oxidized F/MA polymers prepared by different methods of oxidation. Test methods and oxidation methods are described in Example 4, Example 3 and Table IV, below.

The $Ca^{++}$ ion sequestration capacity of the oxidized polymers listed in Table IV, below, was also measured. Results at 0.2 g/l polymer concentration are shown in FIG. 3 which graphically illustrates the relative $Ca^{++}$ sequestration capacity of each builder over a range of calcium ion concentrations.

TABLE IV

Relative $Ca^{++}$ Sequestration[f] by Oxidized F/MA Copolymers and Terpolymers

| Polymer | Oxidation[c] Method | % Oxidation | Mw[d] | Mn[e] |
|---|---|---|---|---|
| Sakalan ® CP-7[a] | Control | — | — | — |
| Hydrolyzed[g] F/MA | Control | — | 10,000 | 4,000 |
| F/MA (Sample A)[h] | 12 | 75 | 3,400 | 1,600 |
| High Molecular Weight F/MA[b] (Sample B)[h] | $O_3$, pH 9 | 58 | 12,300 | 2,400 |
| F/MA (Sample C)[h] | $HNO_3$ | >95 | 1,630 | 1,000 |
| F/MA Terpolymer A (acrylic acid) (Sample D)[h] | $HNO_3$ | >95 | 1,400 | 1,000 |
| F/MA (Sample E)[h] | $O_3$ in $H_2O$/$CH_3OH$ | 67 | 4,800 | 430 |

[a]Control (commercial detergent builder). See Example 4.
[b]Copolymer prepared by the method of Example 2.
[c]See Example 3.
[d]Average molecular weight was determined by gel permeation chromatography.
[e]Number average molecular weight was determined by gel permeation chromatography.
[f]Relative amount of $Ca^{++}$ sequestration is illustrated in FIG. 3.
[g]The anhydride was hydrolyzed to its corresponding carboxyolic acid by heating a suspension of the polymer in water to 70° C.
[h]See FIG. 3 for a comparison of Samples A-E.

These results show that alkaline ozonolysis of the high molecular weight F/MA copolymer of Example 2 produced relative $Ca^{++}$ sequestration capacity equivalent to that of the control (Sokalan CP-7), while maintaining a molecular weight of 12,300.

A comparison in FIG. 3 of the relative $Ca^{++}$ sequestration capacity of the equivalent molecular weight copolymers with and without oxidation, shows that the oxidized polymer was significantly more effective than the unoxidized polymer.

Various modifications and improvements on the compositions herein will become readily apparent to those skilled in the art. Accordingly, the scope and spirit of the invention are to be limited only by the claims and not by the foregoing specification.

We claim:

1. A polymer comprising hydrolysis products and salts thereof of a polymer of furan, maleic anhydride and at least one copolymerized comonomer, comprising a repeating unit of the structure:

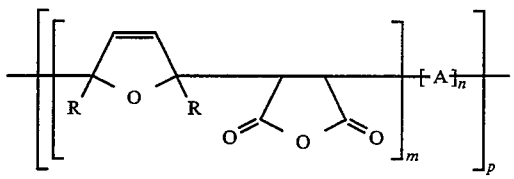

wherein A is a repeating unit derived from at least one copolymerized comonomer, selected from the group consisting of alkenyl alkyl ethers, alkyl acrylates, alkenyl carboxyalkyl ethers, vinyl esters of carboxylic acids, unsaturated carboxylic acids, and unsaturated dicarboxylic acids other than maleic acid and their anhydrides and esters; R is H, —CH$_3$, —CH$_2$CH$_3$, or a combination thereof; m is at least 1; n is greater than zero; and p is an integer from about 5 to 6,000.

2. The polymer of claim 1, wherein the polymer comprises a sodium, potassium, ammonium, monoethanolamine or triethanolamine salt.

3. A polymer comprising hydrolysis products and salts of a polymer of furan, maleic anhydride and at least one copolymerized comonomer, comprising a repeating unit of the structure:

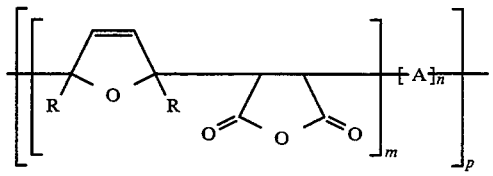

wherein A is a repeating unit derived from isobutyl vinyl ether: R is H, —CH$_3$, —CH$_2$—CH$_3$, or a combination thereof; m is at least 1; n is greater than zero; and p is an integer from about 5to 6,000.

4. A polymer comprising hydrolysis products and salts of a polymer of furan, maleic anhydride and at least one copolymerized comonomer, comprising a repeating unit of structure:

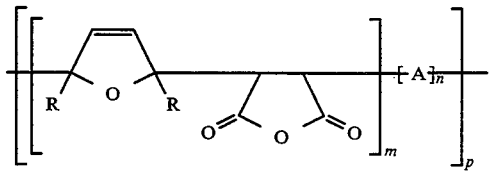

wherein A is a repeating unit derived from methyl acrylate; R is H, —CH$_3$, —CH$_2$CH$_3$, or a combination thereof; m is at least 1; n is greater than zero; and p is an integer from about 5to 6,000.

5. A polymer comprising hydrolysis products and salts of a polymer of furan, maleic anhydride and at least one copolymerized comonomer, comprising a repeating unit of the structure:

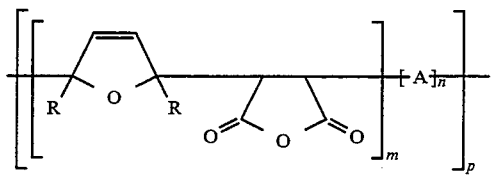

wherein A is a repeating unit derived from acrylic acid; R is H, —CH$_3$, —CH$_2$CH$_3$, or a combination thereof; m is at least 1; n is greater than zero; and p is an integer from about 5 to 6,000.

6. A polymer comprising hydrolysis products and salts of a polymer of furan, maleic anhydride and at least one copolymerized comonomer, comprising a repeating unit of the structure:

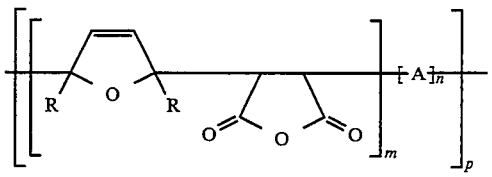

wherein A is a repeating unit derived from itaconic acid; R Is H, —CH$_3$, —CH$_2$CH$_3$, or a combination thereof; m is at least 1; n is greater than zero; and p is an integer from about 5 to 6,000.

7. A polymer comprising hydrolysis products and salts of a polymer of furan, maleic anhydride and at least one copolymerized comonomer, comprising a repeating unit of the structure:

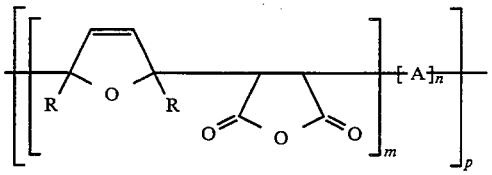

wherein A is a repeating unit derived from methyl vinyl oxyacetate; R Is H, —CH$_3$, —CH$_2$CH$_3$, or a combination thereof; m is at least 1; n is greater than zero; and p is an integer from about 5 to 6,000.

8. The polymer of claim 7, wherein the polymer further comprises ester hydrolysis products derived from the methyl vinyl oxyacetate comonomer.

* * * * *